United States Patent
Jones et al.

(10) Patent No.: US 10,528,900 B2
(45) Date of Patent: Jan. 7, 2020

(54) CARGO UNLOADING APPARATUS AND METHOD

(71) Applicant: Walmart Apollo, LLC, Bentonville, AR (US)

(72) Inventors: Nicholaus A. Jones, Fayetteville, AR (US); Matthew A. Jones, Bentonville, AR (US); Robert J. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/417,419

(22) Filed: Jan. 27, 2017

(65) Prior Publication Data
US 2017/0220980 A1 Aug. 3, 2017

Related U.S. Application Data

(60) Provisional application No. 62/288,048, filed on Jan. 28, 2016.

(51) Int. Cl.
*G06Q 10/06* (2012.01)
*G06Q 10/08* (2012.01)
(Continued)

(52) U.S. Cl.
CPC ....... *G06Q 10/0631* (2013.01); *B65G 63/004* (2013.01); *G01G 19/387* (2013.01);
(Continued)

(58) Field of Classification Search
CPC .................................................. G01G 19/387
See application file for complete search history.

(56) References Cited

U.S. PATENT DOCUMENTS 6,026,378 A * 2/2000 Onozaki ............... G06Q 10/08
705/28
8,175,327 B2 5/2012 Beaty
(Continued)

FOREIGN PATENT DOCUMENTS

CN 101968860 2/2011
CN 204341822 5/2015
(Continued)

*Primary Examiner* — Thomas Randazzo
(74) *Attorney, Agent, or Firm* — Fitch, Even, Tabin & Flannery LLP

(57) ABSTRACT

A control circuit automatically determines a number of unloaders to task with unloading a cargo container at a cargo-container unloading area as a function of (1) the weight of the cargo container including the plurality of physically-discrete shipping containers loaded therein and (2) how many of the physically-discrete shipping containers are loaded in the cargo container. By one approach this comprises calculating a ratio of the weight with respect to the number of physically-discrete shipping containers and correlating that ratio with a human-resource metric. By one approach the number representing how many physically-discrete shipping containers are loaded in a given cargo container is derived from a bill of lading and/or an advanced shipping notice as may correspond to a given shipment. The weight metric, in turn, can be provided by a scale. By one approach the scale is proximal to the cargo-container unloading area.

18 Claims, 3 Drawing Sheets

(51) Int. Cl.
  *G01G 19/387* (2006.01)
  *B65G 63/00* (2006.01)
(52) U.S. Cl.
  CPC ............... *G06Q 10/06311* (2013.01); *G06Q 10/063118* (2013.01); *G06Q 10/083* (2013.01); *G06Q 10/0875* (2013.01)

(56) References Cited

U.S. PATENT DOCUMENTS

| | | | | |
|---|---|---|---|---|
| 8,639,543 | B2 | 1/2014 | Boss | |
| 8,949,148 | B2* | 2/2015 | Kumar | G06Q 10/06 705/28 |
| 9,387,986 | B2* | 7/2016 | Wenzel | B65G 1/04 |
| 9,547,079 | B2* | 1/2017 | Hyatt | G01S 13/74 |
| 2003/0152193 | A1* | 8/2003 | Hodge | G01N 23/04 378/57 |
| 2004/0193466 | A1* | 9/2004 | Kull | G06Q 10/08 705/28 |
| 2004/0230601 | A1* | 11/2004 | Joao | G06Q 10/08 |
| 2005/0216294 | A1* | 9/2005 | Labow | G06Q 10/08 705/333 |
| 2006/0251498 | A1* | 11/2006 | Buzzoni | B65G 63/004 414/139.9 |
| 2009/0171500 | A1* | 7/2009 | Matsumoto | G06Q 10/08 700/217 |
| 2011/0035247 | A1 | 2/2011 | Perry | |
| 2015/0006430 | A1* | 1/2015 | Ben-Alexander | G06Q 10/109 705/337 |
| 2016/0239802 | A1* | 8/2016 | Burch, V | H04W 4/70 |
| 2017/0267267 | A1* | 9/2017 | Bollapragada | B61L 27/0027 |

FOREIGN PATENT DOCUMENTS

| | | |
|---|---|---|
| JP | H0535753 | 9/1993 |
| JP | H0678127 | 10/1994 |
| JP | 5784160 | 9/2015 |

* cited by examiner

CARGO UNLOADING APPARATUS AND METHOD

CROSS-REFERENCE TO RELATED APPLICATION

This application claims the benefit of U.S. Provisional Application No. 62/288,048, filed Jan. 28, 2016, which is incorporated herein by reference in its entirety.

TECHNICAL FIELD

These teachings relate generally to cargo containers and the unloading thereof.

BACKGROUND

A modern loading/unloading facility is often a very busy facility. Such a facility may simultaneously and/or sequentially handle a plurality of cargo containers (such as, but not limited to, modern truck trailers) in a single day. In turn, the contents of these various cargo containers can vary considerably from one container to the next and sometimes even within a single such container. In some cases individual physically-discrete shipping containers in such cargo containers are relatively small in size while others are relatively large. The weights of such individual shipping containers can similarly vary as can the form factor of the shipping containers.

Human unloaders typically unload such cargo containers (sometimes with the assistance of unloading equipment such as pallet movers). The number of unloaders that are appropriate to unload a particular cargo container (and the number or type of unloading equipment they might employ) can vary significantly with respect to the variables described above for the physically-discrete shipping containers that are to be unloaded. For example, a cargo container containing only five large palletized items may be suitably unloaded by only a single unloader using a pallet mover. In another case, however, a cargo container containing hundreds of smaller physically-discrete shipping containers may be better served by a given number of unloaders (some or all of whom may use, for example, a rolling vertical dolly).

Generally speaking, unloading efficiency improves the sooner the correct number of unloaders is determined (and the sooner the correct type and number of unloading equipment is determined).

BRIEF DESCRIPTION OF THE DRAWINGS

The above needs are at least partially met through provision of the cargo unloading apparatus and method described in the following detailed description, particularly when studied in conjunction with the drawings, wherein.

Figure 1:
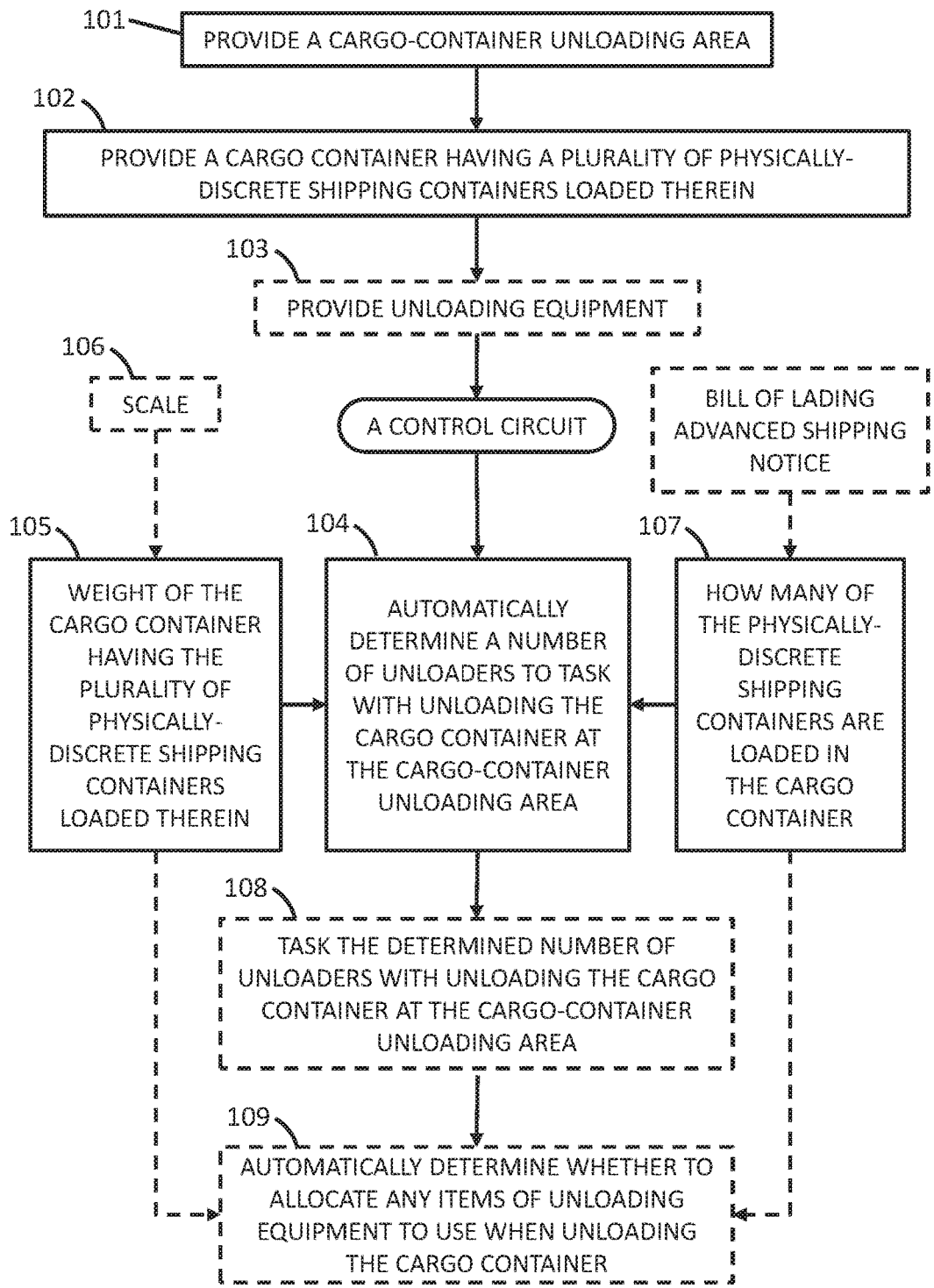
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a control circuit automatically determines a number of unloaders to task with unloading a cargo container at a cargo-container unloading area as a function of (1) the weight of the cargo container including the plurality of physically-discrete shipping containers loaded therein and (2) how many of the physically-discrete shipping containers are loaded in the cargo container. By one approach this comprises calculating a ratio of the weight with respect to the number of physically-discrete shipping containers and correlating that ratio with a human-resource metric.

By one approach the number representing how many physically-discrete shipping containers are loaded in a given cargo container is derived from a bill of lading and/or an advanced shipping notice as may correspond to a given shipment. The weight metric can be provided by a scale. By one approach the scale is proximal to the cargo-container unloading area.

By one approach the control circuit also automatically determines whether to allocate any items of unloading equipment to use when unloading the cargo container at the cargo-container unloading area as a further function of the weight of the cargo container having the plurality of physically-discrete shipping containers loaded therein and how many of the physically-discrete shipping containers are loaded in the cargo container.

So configured, relatively simple and conveniently available metrics are leveraged to reliably determine how many unloaders should be assigned to unload a given cargo container. The control circuit can make this determination, if desired, prior to the cargo container being parked for unloading to permit the appropriate number of unloaders to be immediately available when the cargo container opens to begin the unloading process. Similarly, if desired, the appropriate unloading equipment that may help facilitate unloading or that may be necessary to the unloading process can be timely and efficiently determined and made available.

These teachings are readily and economically practiced and can increase the efficiency of unloading any of a wide variety of cargo containers and any of a wide variety of physically-discrete shipping containers.

Figure 2:
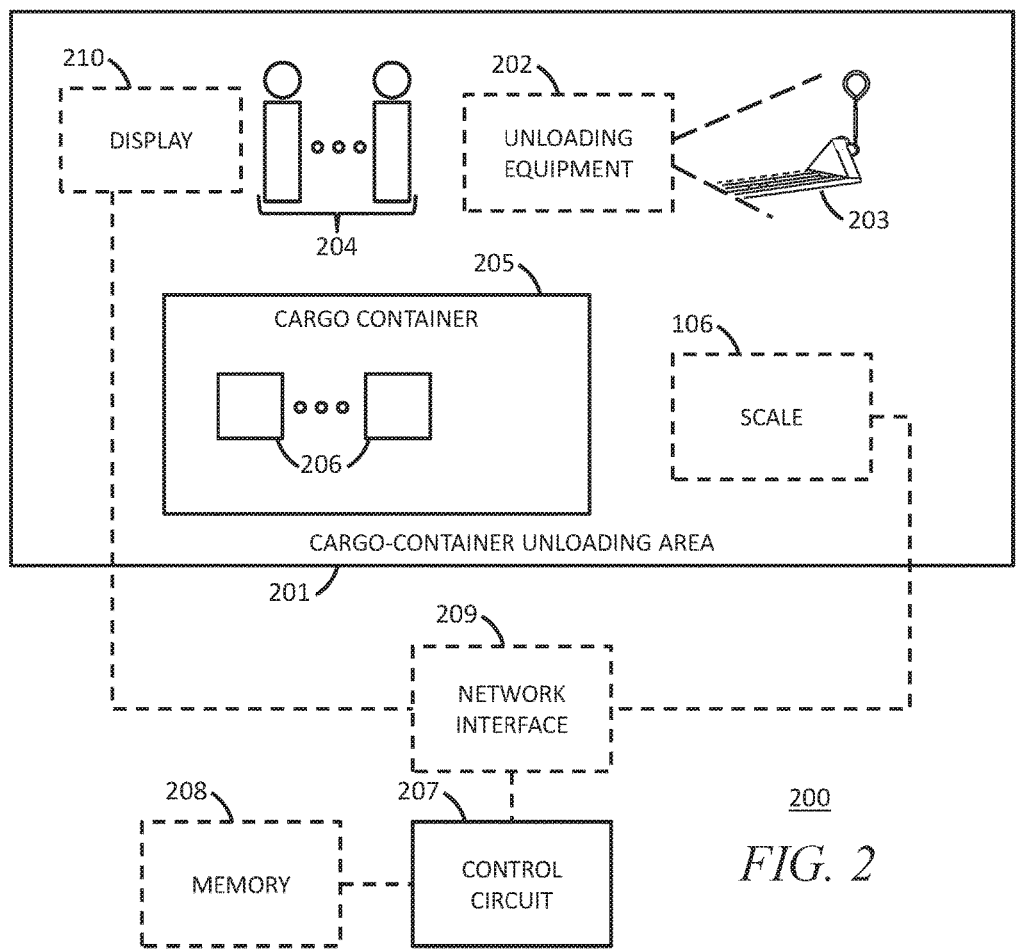
FIG. 2 comprises a block diagram as configured in accordance with various embodiments of these teachings.

These and other benefits may become clearer upon making a thorough review and study of the following detailed description. Referring now to the drawings, FIGS. 1 and 2 present an illustrative process 100 and a corresponding apparatus 200 that is compatible with many of these teachings.

At block 101, this process 100 provides a cargo-container unloading area 201. Cargo-container unloading areas comprise a well-understood area of prior art endeavor. Examples include loading docks, ramps, and bays. These areas generally comprise an area of a building where cargo containers (such as trailers, trucks of various kinds, and so forth) are loaded and unloaded. Such areas are commonly found on commercial and industrial buildings, and warehouses in particular. Cargo-container unloading areas may be permanent or at least fixed in place or may in some cases be temporary or at least readily movable (such as so-called yard ramps).

In this illustrative example the cargo-container unloading area 201 is presumed to be at least of sufficient size to accommodate at least one cargo container. It will be understood that these teachings are readily applied in conjunction with larger-sized cargo-container unloading areas including facilities capable of simultaneously receiving a plurality of cargo containers (such as two such containers, five such containers, or more as appropriate).

In this illustrative example the cargo-container unloading area 201 has a plurality of unloaders 204. These unloaders 204 are human associates (though, if desired, the present teachings can be applied to non-human unloaders such as autonomous or non-autonomous robots capable of performing cargo unloading functions). The present teachings will accommodate any number of such unloaders 204. It is not a requirement of these teachings that any or all of these unloaders 204 be constantly on-site and available at the cargo-container unloading area 201.

At block 102 this process 100 provides a cargo container 205 having a plurality of physically-discrete shipping containers 206 loaded therein. In this illustrative example the cargo container 205 is provided at the aforementioned cargo-container unloading area 201 and may comprise, for example, a relatively-common 53 foot long truck trailer.

At optional block 103, this cargo-container unloading area 201 may optionally include one or more items of unloading equipment 202. For example, this unloading equipment 202 may include one or more pallet movers 203 such as the illustrated hand pallet truck, motorized forklifts, and so forth.

The remaining blocks of this process 100 can be carried out by a control circuit of choice. FIG. 2 provides a particular example in these regards. In particular, the illustrated apparatus 200 further includes a control circuit 207. Being a "circuit," the control circuit 207 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 207 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 207 is configured (for example, by using corresponding programming as will be well understood by those skilled in the art) to carry out one or more of the steps, actions, and/or functions described herein.

By one optional approach the control circuit 207 operably couples to an optional memory 208. This memory 208 may be integral to the control circuit 207 or can be physically discrete (in whole or in part) from the control circuit 207 as desired. This memory 208 can also be local with respect to the control circuit 207 (where, for example, both share a common circuit board, chassis, power supply, and/or housing) or can be partially or wholly remote with respect to the control circuit 207 (where, for example, the memory 208 is physically located in another facility, metropolitan area, or even country as compared to the control circuit 207).

This memory 208 can serve, for example, to non-transitorily store the computer instructions that, when executed by the control circuit 207, cause the control circuit 207 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this example the control circuit 207 also operably couples to an optional network interface 209. So configured the control circuit 207 can communicate with other elements (both within the apparatus 200 and external thereto) via the network interface 209. Network interfaces, including both wireless and non-wireless platforms, are well understood in the art and require no particular elaboration here.

At block 104 this control circuit 207 automatically determines a number of unloaders 204 to task with unloading the cargo container 205 at the cargo-container unloading area 201. In this particular example the control circuit 207 makes this determination as a function of the weight 105 of the cargo container 205 having the plurality of physically-discrete shipping containers 206 loaded therein. The control circuit 207 also makes this determination as a further function of how many (i.e, the number 107) of the physically-discrete shipping containers 206 are loaded in the cargo container 205.

By one approach this process 100 presumes provision of a scale 106 that is located proximal to the cargo-container unloading area 201. By one approach, and as illustrated, this scale 106 is actually within the cargo-container unloading area 201. By another approach, this scale 106 is located outside the cargo-container unloading area 201 but within some predetermined distance thereof. For example, the scale 106 may be located within 1 mile of the cargo-container unloading area 201, within 5 miles of the cargo-container unloading area 201, or some other distance that suits the needs of a given application setting. That scale 106 is then used to weigh the cargo container 205 having the plurality of physically-discrete shipping containers 206 loaded therein to provide the aforementioned weight 105 such that the weight 105 is provided to the control circuit 207.

The number 107 of the physically-discrete shipping containers 206 that are loaded in the cargo container 205, in turn, may be determined in a variety of ways depending upon the application setting. By one approach, for example, that number 107 is derived from a bill of lading that corresponds to the cargo container 205 having the plurality of physically-discrete shipping containers 206 loaded therein. That number may be provided to the control circuit 207 by a human operator or may be automatically gleamed in some appropriate fashion. By another approach, that number 107 may be derived from an advanced shipping notice (ASN) that corresponds to the cargo container 205 having the plurality of physically-discrete shipping containers 206 loaded therein. Bills of lading and advanced shipping notices are well understood in the art and require no further elaboration here.

By one approach the control circuit 207 determines the number of unloaders 204 to task in these regards by calculating a ratio of the weight 105 with respect to the number 107 of how many of the physically-discrete shipping containers 206 are loaded in the cargo container 205. In particular, the control circuit 207 may correlate that ratio with a human-resource metric that indicates the desired number of unloaders 204 to task in these regards. Note, for example, that dividing the number 107 of shipping containers 206 by the weight 105 provides some indication of the size of the shipping containers 206 themselves.

While this ratio is unlikely to accurately reflect the size of each of the shipping containers 206, this general estimate is nevertheless useful to help determine how many unloaders 204 to task in a given instance. Generally speaking, the greater the number of shipping containers 206, the more unloaders 204 may appropriately be assigned. That said, however, the relative weight of each shipping container 206 (viewed, of course, as an average) can similarly impact the appropriate assignment. Where, for example, the shipping containers 206 are especially heavy, it may be appropriate to assign even more unloaders 204 to the task or, conversely, fewer unloaders 204 (who are presumed to employ unloading equipment such as pallet movers).

Figure 3:
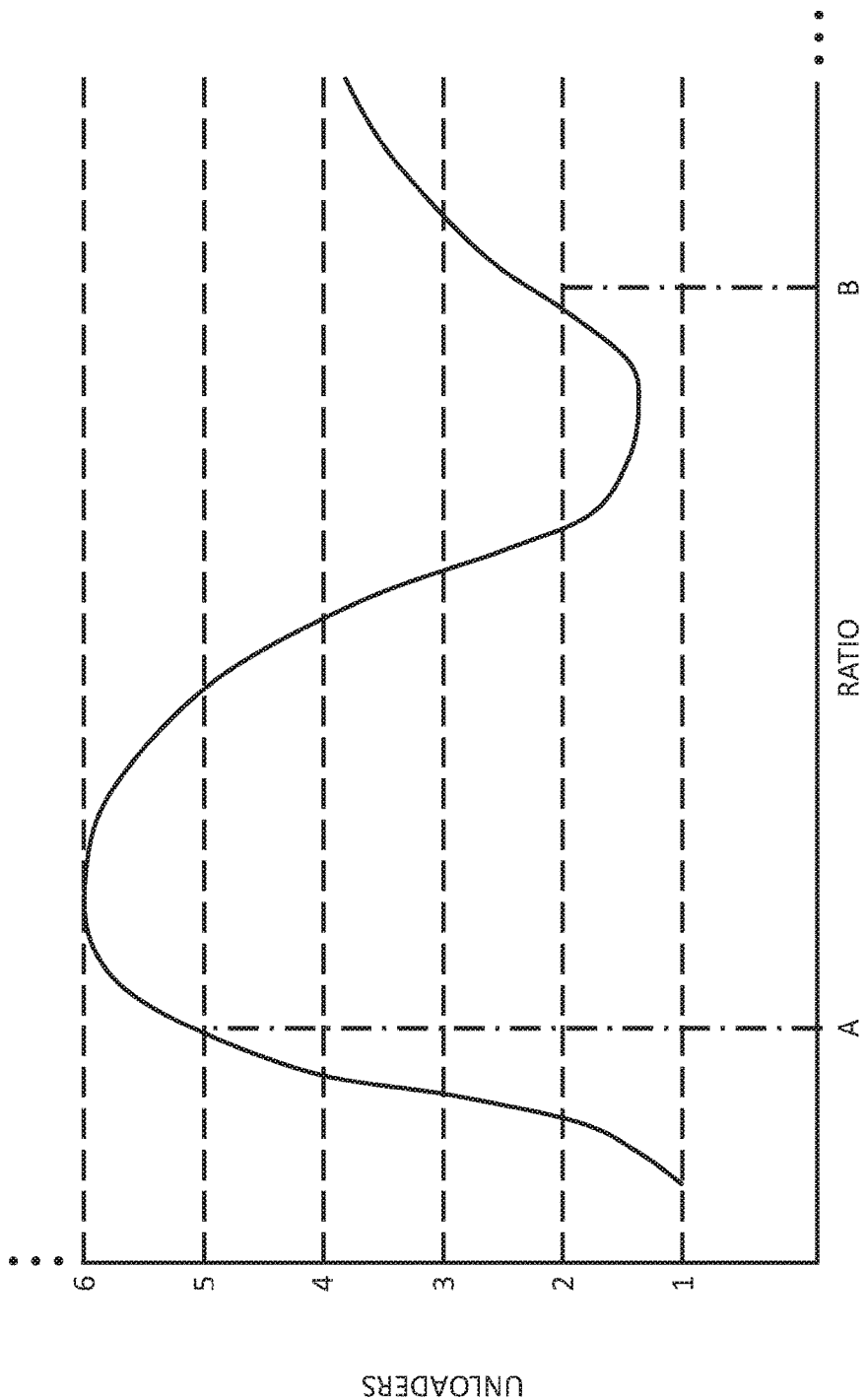
FIG. 3 comprises a graph in accordance with various embodiments of these teachings.

FIG. 3 provides an illustrative non-limiting example in these regards. This figure presents a graph 300 that correlates a number of unloaders to the aforementioned ratio of the weight divided by the number of shipping containers. In this example, a ratio of "A" correlates to 5 unloaders while a ratio of "B" correlates to 2 unloaders. The precise shape of such a curve can vary with the needs and particulars of a given application setting. For example, a curve well suited to unloading cargo containers for a hardware retailer may be different than a curve well suited to unloading cargo containers for a furniture retailer. Such a curve can also be tailored to reflect the various priorities of the unloading enterprise, including safety, efficiency, timeliness, care, and so forth.

In some simple cases the curve may be, at least more or less, a straight line. In other cases the curve may more or less complicated and nuanced and include for example, various curved portions. By one approach an enterprise can empirically develop and fine-tune the one or more curves that are particularly well-suited to their particular application setting.

By one approach, and as illustrated at optional block 108, the control circuit 207 can further serve to task the determined number of the unloaders 204 at the cargo-container unloading area 201 with unloading the cargo container 205 at the cargo-container unloading area 201. By one approach, for example, the control circuit 207 communicatively couples to a display 210 at the cargo-container unloading area 201 and presents, via that display 210, the names of the unloaders 204 that are being assigned to this particular cargo container 205. By another approach the control circuit 207 uses a printer (not shown) to create a hard copy of such an assignment. By yet another approach the control circuit 207 transmits, or causes the transmission of, a message to each of the assigned unloaders 204 (or, if desired, a supervisory person) via, for example, email, text messaging, a mobile device app alert, a Tweet, and so forth.

By another optional approach as illustrated at block 109, in lieu of the foregoing or in combination therewith, the control circuit 207 can automatically determine whether to allocate any items of unloading equipment 202 to use when unloading the cargo container 205. This determination can include the number of unloading equipment items as well indicating different types of unloading equipment items (such as, for example, pallet movers).

By one approach the control circuit 207 again uses the weight of the cargo container having the plurality of physically-discrete shipping containers 206 loaded therein and the number of physically-discrete shipping containers 206 that are loaded in the cargo container 205 to make this determination. By one approach, the control circuit 207 uses the aforementioned ratio formed of these variables and again correlates that ratio to, for example, a particular number of items of unloading equipment 202 to use when unloading the cargo container 205.

So configured, an appropriate number of unloaders (as well, if desired, as an appropriate number of and/or type of unloading equipment) are readily automatically determined using only two fairly general/global variables; the number of items in a cargo container to be unloaded and the overall weight thereof. By one approach these two variables are the only basis by which the control circuit makes the aforementioned determination. These teachings are highly flexible in practice and will readily accommodate experience-based modification to yield automated decisions that are particularly appropriate to a given user and/or application setting.

Those skilled in the art will recognize that a wide variety of modifications, alterations, and combinations can be made with respect to the above described embodiments without departing from the scope of the invention. As one simple example, the aforementioned ratio can compare the number of shipping containers in a given cargo container with only the weight of the shipping containers themselves by subtracting the weight of the unloaded cargo container from the combined weight of the cargo container as loaded with the shipping containers. Accordingly, such modifications, alterations, and combinations are to be viewed as being within the ambit of the inventive concept.

What is claimed is:

1. A method comprising:
providing a cargo-container unloading area;
providing a cargo container having a plurality of physically-discrete shipping containers loaded therein, wherein the cargo container comprises at least one of a truck and a trailer, and wherein at least some of the physically-discrete shipping containers have contents that vary from one of the containers to another;
using a control circuit to automatically determine a number of unloaders to task with unloading the contents of the cargo container at the cargo-container unloading area as a function of a weight of the cargo container having the plurality of physically-discrete shipping containers loaded therein and how many of the physically-discrete shipping containers are loaded in the cargo container by calculating a ratio of the weight with respect to how many of the physically-discrete shipping containers are loaded in the cargo container.

2. The method of claim 1 wherein the control circuit is configured to automatically determine the number of unloaders to task with unloading the contents of the cargo container at the cargo-container unloading area as a function of only the weight of the cargo container having the plurality of physically-discrete shipping containers loaded therein and how many of the physically-discrete shipping containers are loaded in the cargo-container.

3. The method of claim 1 further comprising:
providing a scale proximal to the cargo-container unloading area;
using the scale to weigh the cargo container having the plurality of physically-discrete shipping containers loaded therein to obtain the weight;
providing the weight to the control circuit.

4. The method of claim 1 further comprising:
tasking the determined number of unloaders with unloading the contents of the cargo container at the cargo-container unloading area.

5. The method of claim 1 wherein the control circuit automatically determines the number of unloaders to task with unloading the contents of the cargo container at the cargo-container unloading area by correlating the ratio with a human-resource metric.

6. The method of claim 1 further comprising:
providing to the control circuit a number representing how many of the physically-discrete shipping containers are loaded in the cargo container.

7. The method of claim 6 wherein the number is derived from at least one of:
a bill of lading that corresponds to the cargo container having the plurality of physically-discrete shipping containers loaded therein; and
an advanced shipping notice (ASN) that corresponds to the cargo container having the plurality of physically-discrete shipping containers loaded therein.

8. The method of claim 1 further comprising:
using the control circuit to automatically determine whether to allocate any items of unloading equipment to use when unloading the contents of the cargo container at the cargo-container unloading area as a function of the weight of the cargo container having the plurality of physically-discrete shipping containers loaded therein and how many of the physically-discrete shipping containers are loaded in the cargo container.

9. The method of claim 8 wherein at least one of the items of unloading equipment comprises a pallet mover.

10. An apparatus comprising:
a cargo-container unloading area;
a cargo container having a plurality of physically-discrete shipping containers loaded therein, wherein the cargo container comprises at least one of a truck and a trailer, and wherein at least some of the physically-discrete shipping containers have contents that vary from one of the containers to another;
a control circuit configured to automatically determine a number of unloaders to task with unloading the contents of the cargo container at the cargo-container unloading area as a function of a weight of the cargo container having the plurality of physically-discrete shipping containers loaded therein and how many of the physically-discrete shipping containers are loaded in the cargo container by calculating a ratio of the weight with respect to how many of the physically-discrete shipping containers are loaded in the cargo container.

11. The apparatus of claim 10 wherein the control circuit is configured to automatically determine the number of unloaders to task with unloading the contents of the cargo container at the cargo-container unloading area as a function of only the weight of the cargo container having the plurality of physically-discrete shipping containers loaded therein and how many of the physically-discrete shipping containers are loaded in the cargo-container.

12. The apparatus of claim 10 further comprising:
a scale disposed proximal to the cargo-container unloading area and configured to weigh the cargo container having the plurality of physically-discrete shipping containers loaded therein to obtain the weight;
and wherein the control circuit is further configured to receive the weight.

13. The apparatus of claim 10 wherein the control circuit is further configured to task the determined number of unloaders with unloading the cargo container at the cargo-container unloading area.

14. The apparatus of claim 10 wherein the control circuit is configured to automatically determine the number of unloaders to task with unloading the contents of the cargo container at the cargo-container unloading area by correlating the ratio with a human-resource metric.

15. The apparatus of claim 10 wherein the control circuit is further configured to receive a number representing how many of the physically-discrete shipping containers are loaded in the cargo container.

16. The apparatus of claim 15 wherein the number is derived from at least one of:
a bill of lading that corresponds to the cargo container having the plurality of physically-discrete shipping containers loaded therein; and
an advanced shipping notice (ASN) that corresponds to the cargo container having the plurality of physically-discrete shipping containers loaded therein.

17. The apparatus of claim 10 wherein the control circuit is further configured to automatically determine whether to allocate any items of unloading equipment to use when unloading the contents of the cargo container at the cargo-container unloading area as a function of the weight of the cargo container having the plurality of physically-discrete shipping containers loaded therein and how many of the physically-discrete shipping containers are loaded in the cargo container.

18. The apparatus of claim 17 wherein at least one of the items of unloading equipment comprises a pallet mover.

* * * * *